United States Patent [19]

Crane et al.

[11] Patent Number: 5,749,135
[45] Date of Patent: May 12, 1998

[54] METHOD FOR EXTRUDING INTEGRAL SEAT BACK FRAME

[75] Inventors: Robert Scott Crane, Waterford; David Philip Kolena, Bloomfield Hills; Alan Dean Berg, North Washington, all of Mich.

[73] Assignee: General Motors Corporation, Detroit, Mich.

[21] Appl. No.: 820,598

[22] Filed: Mar. 19, 1997

[51] Int. Cl.⁶ .................................................. B23P 17/00
[52] U.S. Cl. ........................... 29/415; 29/417; 297/452.2; 72/254; 72/256; 72/369; 72/370
[58] Field of Search .................... 29/897.2, 415, 29/417; 297/452.18, 452.19, 452.2; 72/254, 256, 367, 368, 369, 370

[56] References Cited

U.S. PATENT DOCUMENTS

| | | | |
|---|---|---|---|
| 4,544,204 | 10/1985 | Schmale | 297/452.2 |
| 5,333,775 | 8/1994 | Bruggemann et al. | 228/157 |
| 5,338,100 | 8/1994 | Rees | 297/452.1 |
| 5,412,860 | 5/1995 | Miyauchi et al. | 29/897.2 |
| 5,557,961 | 9/1996 | Ni et al. | 72/61 |
| 5,567,017 | 10/1996 | Bourgeois et al. | 297/452.2 |

*Primary Examiner*—David P. Bryant
*Attorney, Agent, or Firm*—Patrick M. Griffin

[57] ABSTRACT

A method for producing a U shaped seat back frame from a single extruded blank. The blank's cross section is nearly circular, but with a pair of short, flattened off crests that create a pair of concentric arcs, in cross section. Over a length of each end of the blank, a rectangular cross section, solid mandrel is inserted between the crests and the arcs are flattened against the mandrel. The arcs are flattened into wider side walls, while the crests move apart, without deformation, to create narrower and stiffer walls of a rectangular cross section. Lastly, the U blank with flattened ends is bent into a U shape, creating an upper beam with a nearly circular cross section, and legs with truly flat and rectangular lower ends.

3 Claims, 3 Drawing Sheets

METHOD FOR EXTRUDING INTEGRAL SEAT BACK FRAME

TECHNICAL FIELD

This invention relates to vehicle seat back frames in general, and specifically to an improved method for forming such a frame from a single extruded blank.

BACKGROUND OF THE INVENTION

Vehicle seat back frames are generally the shape of an upside down U, with an upper beam, to which a head rest may be attached, and a pair of lower legs, the ends of which are pivoted to the lower frame of the seat, usually with a recliner mechanism. The upper beams and the lower ends of the legs have very different structural requirements, which call for very different cross sectional shapes. The upper beam, as well as the upper portions of the legs adjacent thereto, are primarily intended to resist torsional or twisting forces that tend to warp the frame out of its plane. A cylindrical shape with a circular cross section is most efficient for that requirement. The lower ends of the legs are pivoted to other, flat structures, such as brackets, and a flat or rectangular cross section is most useful there. As a consequence, seat back frames have typically been simply fabricated from different pieces of tubing having those desired shapes, which are welded together. A seat back frame fabricated from a single piece of tubing would present obvious manufacturing efficiencies, but tubing is typically extruded or otherwise formed so as to have a single cross section, at least initially. Subsequent operations are needed to reshape various areas of the original cross section of the tube into the desired, differing cross sections. Known methods for doing this fall short either by creating significant scrap and waste, or by not really achieving the ideal cross sectional shape.

One example may be seen in U.S. Pat. No. 5,412,860 issued May 9, 1995 to Miyauchi, et al. A tube is extruded with large, flat wings running along both sides of a central section, the shape of which is best adapted to serve as the upper beam of the seat back frame. The flat wings are better suited for the end of the legs. The wings are therefore simply cut away and discarded all along the top beam of the frame and along the upper portion of the legs. This represents both an additional operation and a significant waste of scrap metal. Another example is disclosed in U.S. Pat. No. 5,338,100 issued Aug. 16, 1994 to Rees. A seat back frame is formed from a single blank that is initially round in cross section with a constant wall thickness. The ends of the round tube that will form the lower ends of the legs of the U shaped frame are next "upset" to increase their thickness, and the tube is then bent into the basic U shape. Finally, the ends of the round legs are made "flat sided". "Flat sided" is, as the patent admits, a term of art, since the legs are not really flat, but elliptical in cross section. Thus, the ends of the legs are flatter than the round blank initially was, as well as thicker in wall section, but they are not flat per se, nor rectangular in cross section. There is no scrap wasted, but two operations, the wall thickening and the flattening, are needed to form the legs, which are not really of an ideal shape when completed.

SUMMARY OF THE INVENTION

The invention provides a method for producing a U shaped seat back frame from a single extruded blank which has an ideal cross sectional shape, but without any scrappage, and with a minimal number of operations.

The first step in the process is the extrusion of a constant cross section aluminum blank, which is cut to the desired length. The cross section is nearly circular, except for a pair of diametrically opposed, parallel flat crests. The crests divide the cross section of the blank into a pair of arcs, so that the separation of the crests is, in effect, equal to the cord length of the arcs. The crests are relatively narrow, so that the circular shape of the overall cross section is substantially retained, but they have a wall thickness greater than the arcuate portions of the cross section.

A solid mandrel is provided which is basically matched to the width and separation of the crests. The mandrel has a rectangular cross section with flat side surfaces equal in width to the separation of the crests and flat edges equal in width to the crests. Therefore, the mandrel can be inserted freely, but closely, into either end of the blank, with its edges abutted with the inner surfaces of the crests. A pair of dies are also provided which have flat surfaces somewhat wider than the desired final width for the ends of the seat back frame legs.

To create the desired cross sectional shape of the legs, the mandrel is inserted as described into an end of the blank, to a depth equal to the portion that it is desired to flatten, and rigidly held in place. The dies are then pressed inwardly against the arcs of the blank, which flattens the arcs against the side surfaces of the mandrel to form a pair of flat side walls with a width greater than the cords of the original arcs. Concurrently, the crests are forced outwardly and away from each other and away from the edges of the mandrel. Despite the lack of support from the edges of the mandrel, the flattening action does not disturb the original shape of the shorter, thicker and, stiffer crests, which provide flat, short, and correspondingly thicker walls joining the thinner, wider side walls. The resultant cross section is a rectangle wider than the mandrel, but equal to the mandrel in thickness.

Finally, the blank with flattened ends is bent around into the desired U shape. The top beam of the U shape has essentially a round cross section, undisturbed from the original cross sectional shape of the blank, which is ideal for resisting twisting or "out of plane" bending forces. The wider side walls of the rectangular lower portion of the frame legs are truly flat, ideal for the attachment of recliners or similar components. The shorter walls, being thicker, are ideally suited for the resistance of fore and aft bending forces perpendicular to the plane of the frame. There is no scrap produced, and an absolute minimum number of operational steps required.

BRIEF DESCRIPTION OF THE DRAWINGS

These and other features of the invention will appear from the following written description and from the drawings, in which.

DESCRIPTION OF THE PREFERRED EMBODIMENT

Figure 1:
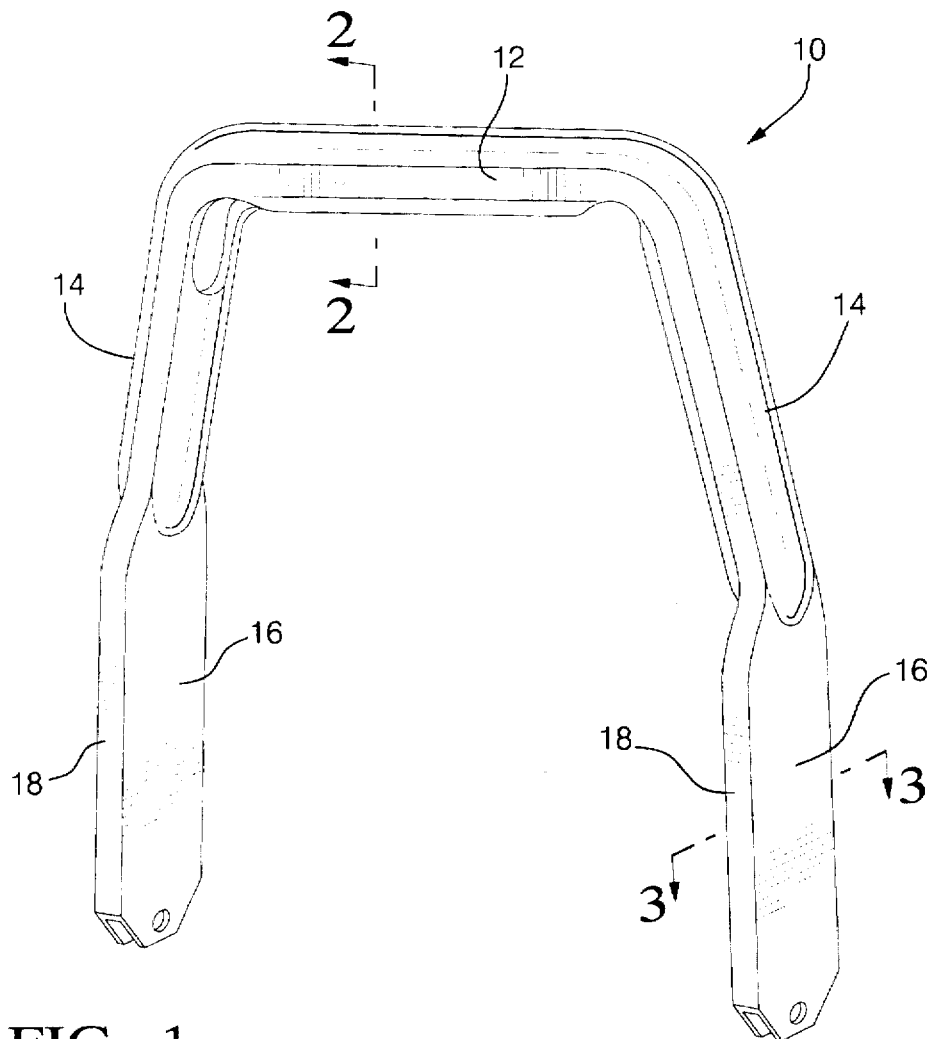
FIG. 1 is a perspective view of the basic U shaped seat back frame made according to the method of the invention.
Figure 2:
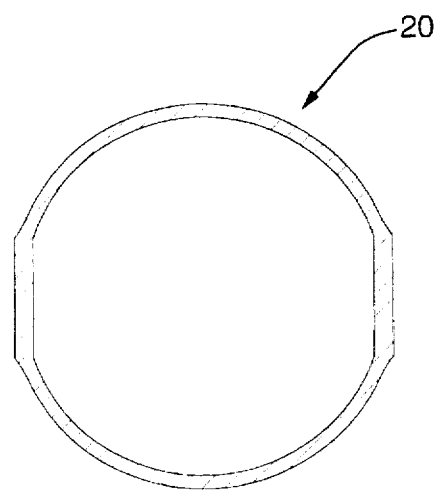
FIG. 2 is a cross section taken along the line 2—2 of FIG. 1.
Figure 3:
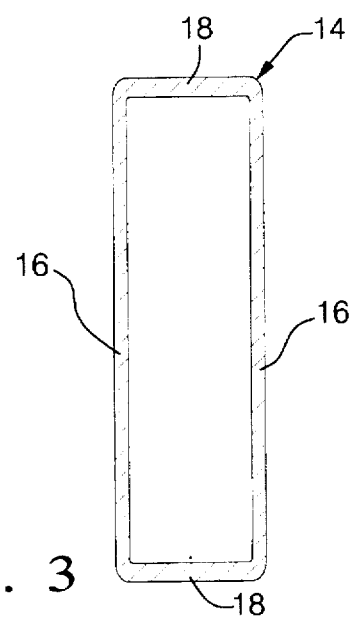
FIG. 3 is a cross section taken along the line 3—3 of FIG. 1.

Referring first to FIGS. 1 through 3, a completed seat back frame made according to the method of the invention is indicated generally at 10. Frame 10 is basically U shaped, with an upper beam 12 and a pair of depending legs 14 that lie substantially in a plane. Frame 10 is shown in its most basic, one piece form, before the addition of any cross bracing, head rest, recliner, pivots or the like. Frame 10 is an integral, aluminum piece, formed and bent from a straight extruded blank, as described below. As seen in FIG. 2, upper beam 12, as well as the upper length of the legs 14, is substantially circular in cross section. As a consequence, it is well suited to resist twisting or bending forces that would tend to push or pull the upper beam 12 and legs 14 out of their normal, substantially coplanar relation. As best seen in FIG. 3, a good portion of the lower length of the legs 14 is rectangular in cross section, with wider side walls 16 joined by narrower and thicker flat walls 18. Therefore, the lower ends of the legs 14 are well suited for the attachment of recliners, pivots or other structures to their inner or outer surfaces. The narrower and thicker flat walls 18 are better suited to resisting forces that act to bend the frame 10 back and forth, generally perpendicular to its plane. These very different and purpose dedicated shapes are attained in a single, integral piece with no scrappage and with a minimum of manufacturing steps.

Figure 4:
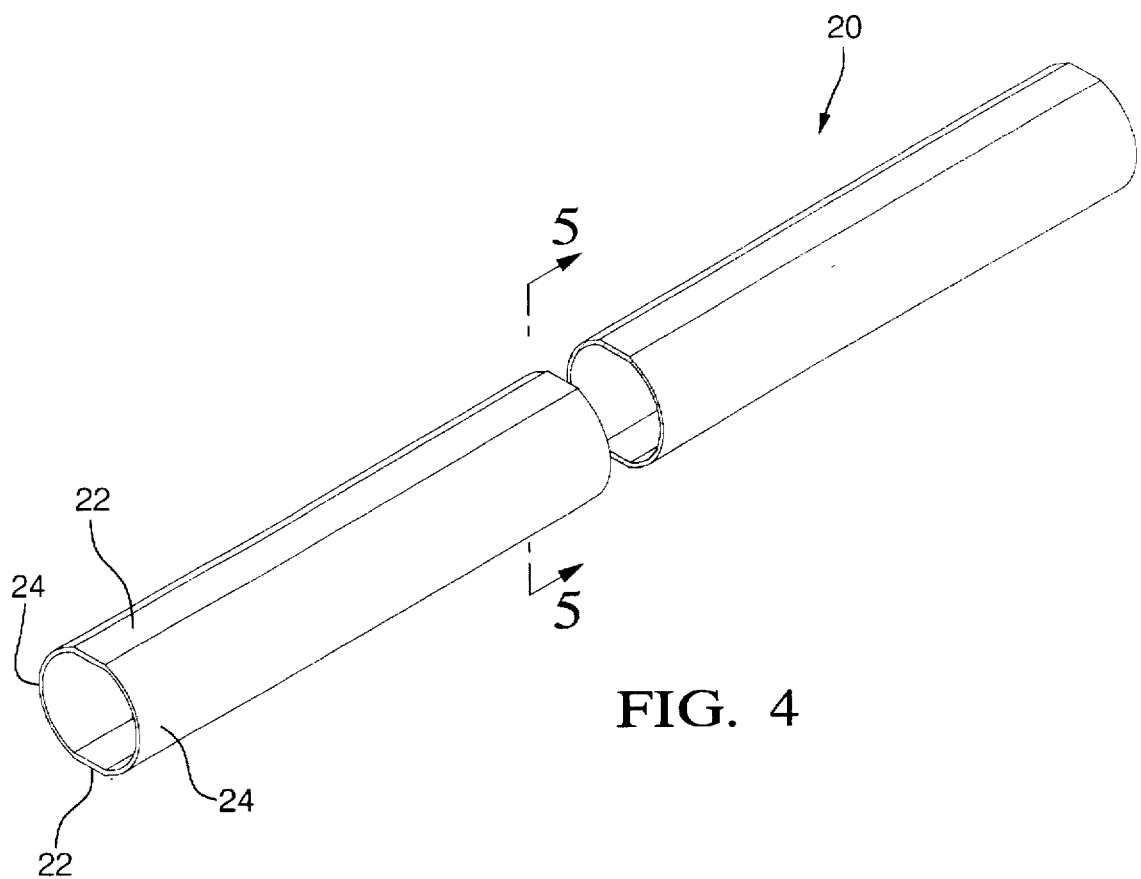
FIG. 4 is a perspective view of the original blank.
Figure 5:
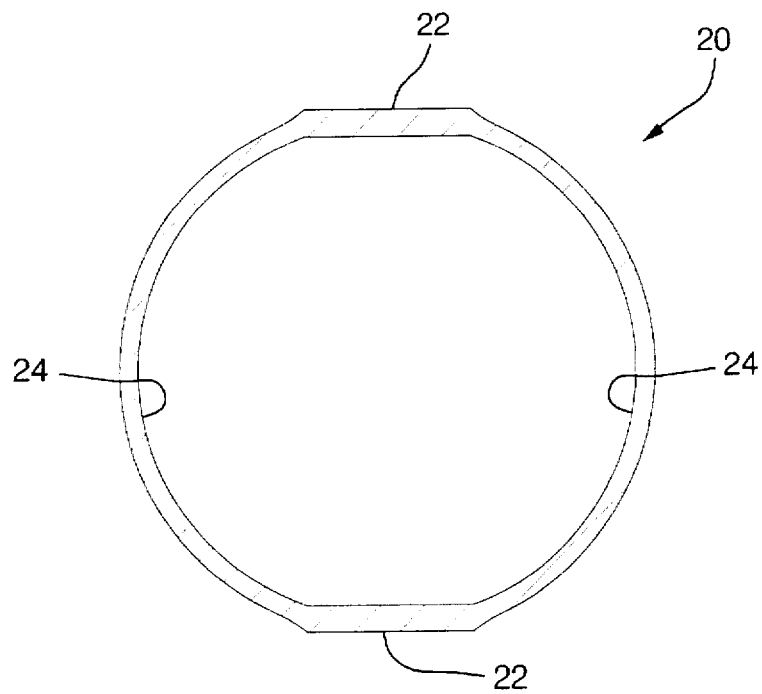
FIG. 5 is a cross section taken along the line 5—5 of FIG. 4.

Referring next to FIGS. 4 and 5, the original blank from which frame 10 is produced is indicated generally at 20. Blank 20 is an integral aluminum extrusion, produced by conventional means. As seen in FIG. 5, blank 20 has a constant cross section which is substantially, but not completely, circular. Specifically, its cross section is non circular only by virtue of being "flattened off" by a pair of identical, narrow, flat crests 22. The crests 22 separate a pair of concentric circular side arcs 24, each of which subtends about 140 degrees. The parallel cords (or cord lengths) of each arc 24 are perpendicular to the crests 22, equal in length to the separation between the crests 22. It will be noted that the wall thickness of the crests 22 is greater than the arcs 24, for a purpose noted above. The extrusion process by which blank 22 is formed can easily provide an elongated tubular blank with differing wall thicknesses around the cross section, so long as the cross section wall thicknesses are the same all along the length of the blank. The die is simply cut so as to provide whatever wall thickness is desired. To provide differing wall thicknesses along the length of the blank is more difficult, requiring either the kind of upsetting operation described above, or requiring that different extrusions be butt welded together to create one blank.

Figure 6:
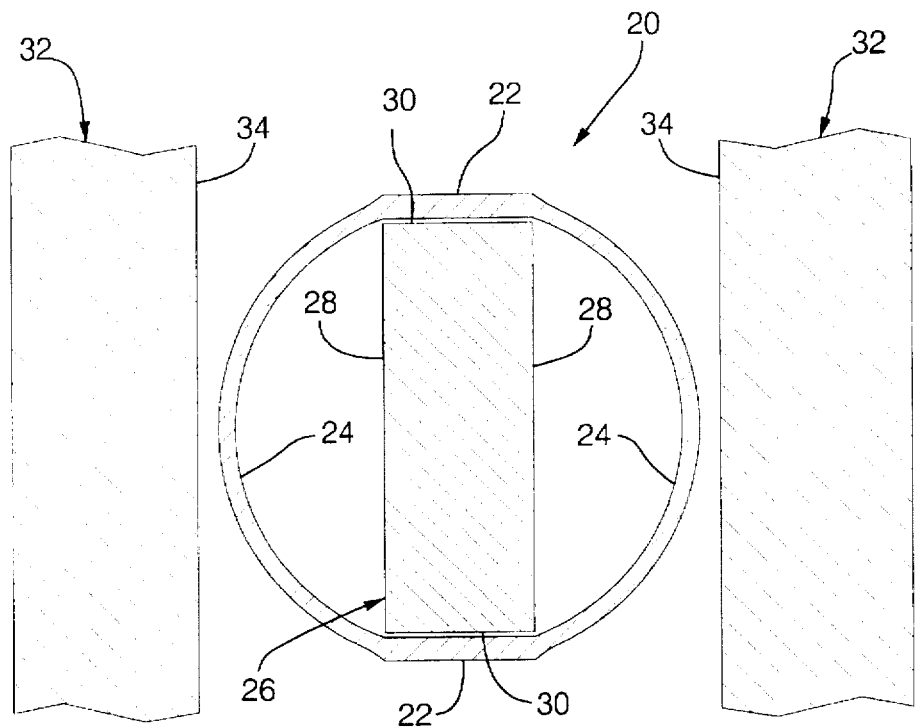
FIG. 6 is a cross section of the mandrel showing its insertion into an end of the blank, and showing the dies spaced to the sides of the end of the blank.

Referring next to FIG. 6, an elongated mandrel of rectangular cross section, indicated generally at 26, is machined from die steel or other solid material. The constant cross section of mandrel 26 is comprised of a pair of wider side surfaces 28 and narrower, flat edges 30. The width of the side surfaces 28 is substantially equal to the cord length of the arcs 24, and the thickness of the flat edges 30 is substantially equal to the width of the crests 22. Mandrel 26 is adapted to be inserted into either end of the blank 20, to a depth just greater than the length of the leg 14 that it is desired to flatten. The other apparatus used for the flattening operation is a pair of identical dies, indicated generally at 32, each of which has a flat surface 34 somewhat wider than the ultimate width desired for the flattened ends of the legs 14. The flat die surfaces 34 also have a length at least equal the portion of the legs 14 to be flattened, and may terminate in a sloped or conical surface, not illustrated, which provides a transition back into the basic shape of the extruded blank 20. To finish the end of each leg 14, the mandrel 26 is first inserted as shown and clamped rigidly in a non illustrated support to hold it steady. The outer surfaces of the mandrel edges 30 fit closely, but do not bind, between the inner surfaces of the crests 22.

Figure 7:
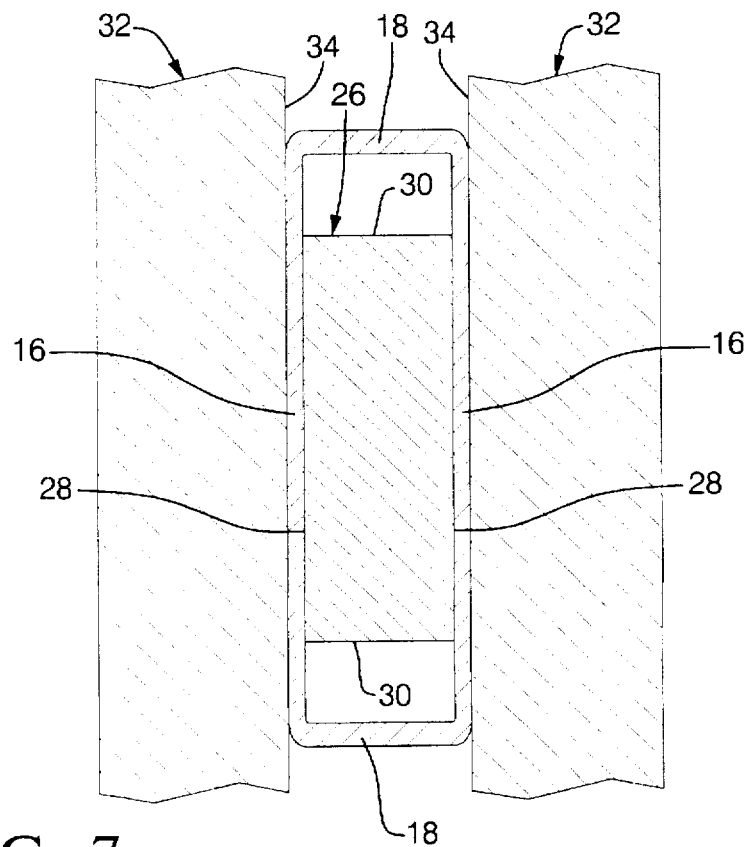
FIG. 7 shows the dies having flattened the side arcs of the blank into and against the mandrel.

Referring next to FIG. 7, the dies 32 are next pressed inwardly, pushing the die flat surfaces 34 against the arcs 24. The two arcs 24, over as much of their length as is contacted by the dies 32, are simultaneously pressed inwardly and flattened against the mandrel side surfaces 28. The upper length of the legs 14 remain the same shape as the blank 20. Because the curved arc length of an arc is greater than its straight cord length, the arcs 24 lengthen as they flatten, finally producing the wider side walls 16 described above. At the same time, the flattening of the arcs 24 serves to push the crests 24 out and away from one another, and away from the mandrel edges 30, which provide a locating function during the insertion of mandrel 26, but no support action. The shorter and stiffer crests 22 are not deformed or bent out of their flat shape during this process, and the flattening force of the dies 32 acts preferentially on the thinner arcs 24. Once the flattening is completed, the mandrels 26 can be removed. Finally, the blank 20 with its flattened ends is simply bent into the desired U shape by a conventional bending apparatus, producing the finished seat frame already described above. The flattened ends actually ease the bending process, since it is far easier to apply a bending force to a flat than a round surface. There is no scrap produced in the process, and, beyond the extruding and bending process, which cannot be eliminated, only the flattening step is needed to produce the ideal, truly flat and rectangular cross section for the ends of the legs 14.

Some variations of the method disclosed would be possible. The arcs 24 need not be exactly concentric, or on the same circle. Instead, each could be effectively spaced to either side of an original center point, like a circle bisected with the two halves pulled apart. In that case, the two arcs plus the shorter crests between them would give a cross section that was more oval, though still substantially circular, and which was therefore not quite as ideally suited to resisting twisting forces as a more nearly circular cross section with concentric arcs. Such a cross section could incorporate arcs with a greater arc length, however, even a full 180 degrees, thereby producing wider side walls when pushed into their ultimate, flattened condition. The crests 22 in the original cross section need not be extruded with a greater wall thickness. Their narrowness alone, coupled with the fact that they are essentially perpendicular to the arcs 24, assures they will be essentially unaffected by the flattening of the arcs 24. However, it adds no time or expense to extrude the crests 22 thicker, and the advantage of improved bending resistance in the frame legs 14 is achieved in the process. It would also be theoretically possible to perform the flattening operation after the bending process. However, as noted, it is easier to apply a bending force to flat surfaces, so there is an advantage in performing the bending step last. Therefore, it will be understood that it is not intended to limit the invention to just the embodiment disclosed.

We claim:

1. A method for producing a generally U shaped seat back frame from a single extruded blank, comprising the steps of, extruding a straight blank with a substantially circular cross section comprised of a pair of arcs which have equal length, parallel cords separated by a pair of integral, parallel flat crests having a constant width and a separation equal to the cords of said arcs, cutting said straight blank to a desired end to end length, providing a solid mandrel of generally rectangular cross section with flat side surfaces substantially equal in width to said arc cords and parallel, flat edges substantially equal in thickness to the width of said crests, inserting said mandrel partially into each end of said straight blank with said edges engaged with said crests, flattening the arcs of said straight blank inwardly against said solid mandrel's side surfaces, thereby creating rectangular cross section lower legs at each end of said blank having a pair of flattened side walls partly supported by said mandrel side surfaces, but having a total width greater than the width of said mandrel side surfaces, and simultaneously creating a pair of flat, shorter walls having a width substantially equal to the thickness of said mandrel edges, but totally unsupported by said mandrel edges, and bending said flattened ends into the desired final U shape, thereby creating a unitary seat back frame leaving an upper beam and adjacent side beams with the same substantially circular cross section as said blank, so as to efficiently resist twisting forces, but with rectangular cross section lower legs suitable for attachment to other seat frame components.

2. A method for producing a generally U shaped seat back frame from a single extruded blank, comprising the steps of, extruding a straight blank with a substantially circular cross section comprised of a pair of arcs which have equal length, parallel cords separated by a pair of integral, parallel flat crests a having a constant width, a wall thickness greater than said arcs, and a separation equal to the cords of said arcs, cutting said straight blank to a desired end to end length, providing a solid mandrel of generally rectangular cross section with flat side surfaces substantially equal in width to said arc cords and parallel, flat edges substantially equal in thickness to the width of said crests, inserting said mandrel partially into each end of said straight blank with said edges engaged with said crests, flattening the arcs of said straight blank inwardly against said solid mandrel's side surfaces, thereby creating rectangular cross section lower legs at each end of said blank having a pair of flattened side walls partly supported by said mandrel side surfaces, but having a total width greater than the width of said mandrel side surfaces, and simultaneously creating a pair of flat, shorter walls having a width substantially equal to the thickness of said mandrel edges and a wall thickness equal to the thickness of said crests, but totally unsupported by said mandrel edges, and bending said flattened ends into the desired final U shape, thereby creating a unitary seat back frame leaving an upper beam and adjacent side beams with the same substantially circular cross section as said blank, so as to efficiently resist twisting forces, but with rectangular cross section lower legs having wider, flat side walls suitable for attachment to other seat frame components and having shorter, thicker walls for resisting back and forth bending forces.

3. A method for producing a generally U shaped seat back frame from a single extruded blank, comprising the steps of, extruding a straight blank with a substantially circular cross section comprised of a pair of concentric arcs which have equal length, parallel cords separated by a pair of integral, parallel flat crests a having a constant width, a wall thickness greater than said arcs, and a separation equal to the cords of said arcs, · cutting said straight blank to a desired end to end length, providing a solid mandrel of generally rectangular cross section with flat side surfaces substantially equal in width to said arc cords and parallel, flat edges substantially equal in thickness to the width of said crests, inserting said mandrel partially into each end of said straight blank with said edges engaged with said crests, flattening the arcs of said straight blank inwardly against said solid mandrel's side surfaces, thereby creating rectangular cross section lower legs at each end of said blank having a pair of flattened side walls partly supported by said mandrel side surfaces, but having a total width greater than the width of said mandrel side surfaces, and simultaneously creating a pair of flat, shorter walls having a width substantially equal to the thickness of said mandrel edges and a wall thickness equal to the thickness of said crests, but totally unsupported by said mandrel edges, and bending said flattened ends into the desired final U shape, thereby creating a unitary seat back frame leaving an upper beam and adjacent side beams with the same substantially circular cross section as said blank, so as to efficiently resist twisting forces, but with rectangular cross section lower legs having wider, flat side walls suitable for attachment to other seat frame components and having shorter, thicker walls for resisting back and forth bending forces.

* * * * *